US006982020B2

(12) United States Patent
Swiszcz et al.

(10) Patent No.: US 6,982,020 B2
(45) Date of Patent: Jan. 3, 2006

(54) METHOD OF MAKING A DUAL-LAMINATE HONEYCOMB PANEL

(75) Inventors: Paul G. Swiszcz, Boulder, CO (US); Jason T. Throne, Steamboat Springs, CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 356 days.

(21) Appl. No.: 10/172,686

(22) Filed: Jun. 12, 2002

(65) Prior Publication Data

US 2002/0160148 A1 Oct. 31, 2002

Related U.S. Application Data

(62) Division of application No. 09/487,974, filed on Jan. 20, 2000, now Pat. No. 6,416,842.

(60) Provisional application No. 60/116,867, filed on Jan. 22, 1999.

(51) Int. Cl.
*B29C 53/36* (2006.01)

(52) U.S. Cl. ........................ 156/203; 156/65; 156/217; 156/218; 156/221

(58) Field of Classification Search .................. 156/65, 156/197, 200, 201, 203, 217, 218, 221, 222, 156/226, 227; 160/84.04, 84.05, 136, 166.1, 160/179; 428/77, 116, 178, 188, 190; 52/793.1, 52/793.11
See application file for complete search history.

(56) References Cited

U.S. PATENT DOCUMENTS

| | | | | |
|---|---|---|---|---|
| 4,019,554 A | | 4/1977 | Rasmussen | |
| RE30,254 E | | 4/1980 | Rasmussen | |
| 4,450,027 A | | 5/1984 | Colson | |
| 4,603,072 A | | 7/1986 | Colson | |
| 4,631,108 A | | 12/1986 | Colson | |
| 4,631,217 A | | 12/1986 | Anderson | |
| 4,673,600 A | | 6/1987 | Anderson | |
| 4,676,855 A | | 6/1987 | Anderson | |
| 4,677,012 A | | 6/1987 | Anderson | |
| 4,685,986 A | | 8/1987 | Anderson | |
| 4,795,515 A | | 1/1989 | Kao et al. | |
| 4,871,006 A | | 10/1989 | Kao et al. | |
| 4,943,454 A | | 7/1990 | Neff | |
| 5,188,160 A | | 2/1993 | Jelic | |
| 5,205,333 A | | 4/1993 | Judkins | |
| 5,205,891 A | | 4/1993 | Neff | |
| 5,228,936 A | | 7/1993 | Goodhue | |
| 5,482,750 A | | 1/1996 | Colson et al. | |
| 5,746,266 A | * | 5/1998 | Colson et al. | 160/84.05 |
| 5,888,639 A | | 3/1999 | Green et al. | 428/304.4 |
| 5,974,763 A | | 11/1999 | Colson et al. | |

(Continued)

FOREIGN PATENT DOCUMENTS

EP 0 692 602 A1 1/1996

(Continued)

OTHER PUBLICATIONS

US 4,622,255, 11/1986, Anderson (withdrawn)

*Primary Examiner*—Gladys J P Corcoran
(74) *Attorney, Agent, or Firm*—Dorsey & Whitney LLP

(57) ABSTRACT

A dual-laminate honeycomb panel permits the use of two or more different materials to form a single panel. In this manner, a retractable covering for an architectural opening may be formed that has a different appearance depending upon which side of the panel is being viewed. The resultant panel is formed by attaching a plurality of elongated precursor tubular cells, wherein each precursor tubular cell itself comprises two strips of material attached to one another.

11 Claims, 7 Drawing Sheets

U.S. PATENT DOCUMENTS 6,045,890 A 4/2000 Green et al. ................ 428/178
6,052,966 A 4/2000 Colson et al.
6,103,336 A 8/2000 Swiszcz
6,284,347 B1 9/2001 Green et al.
6,416,842 B1 7/2002 Swiszcz et al.

FOREIGN PATENT DOCUMENTS

WO WO 99/38682 8/1999

* cited by examiner

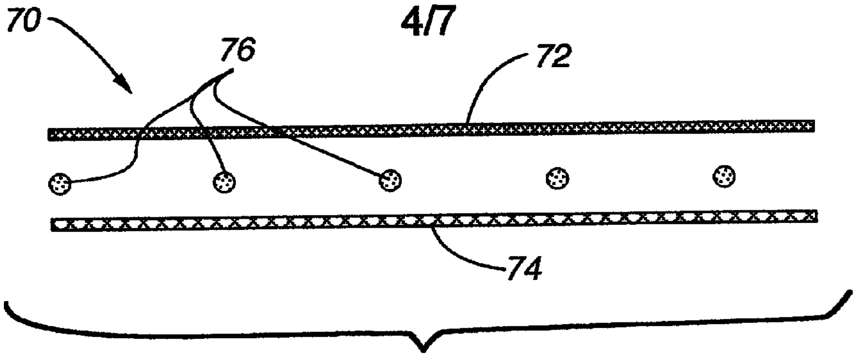
Fig. 10
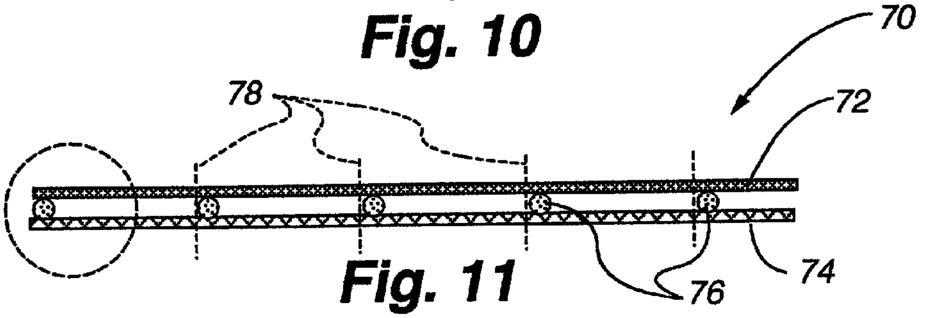
Fig. 11
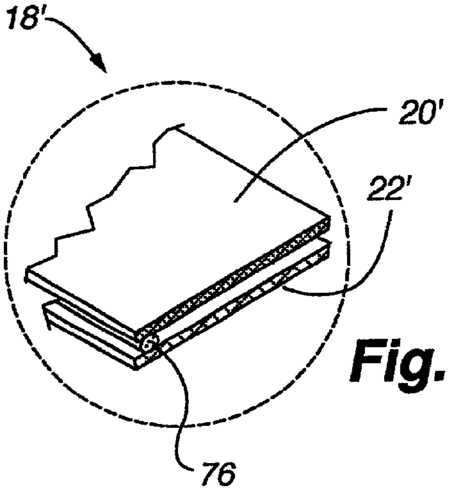
Fig. 12
Fig. 14
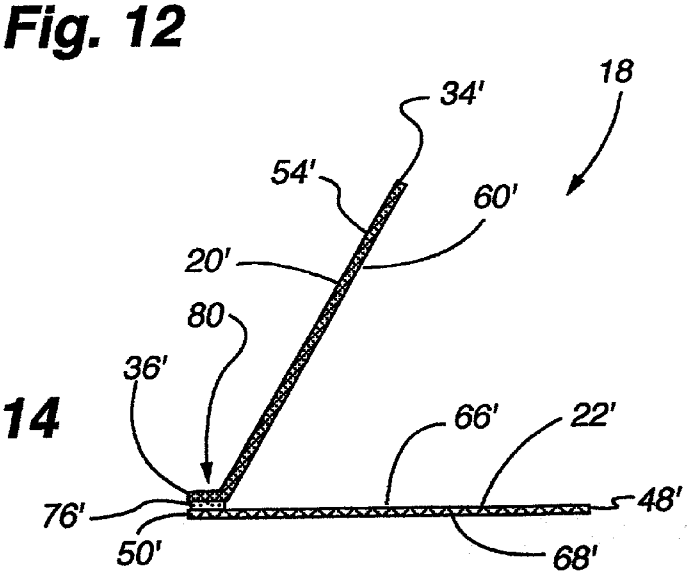

METHOD OF MAKING A DUAL-LAMINATE HONEYCOMB PANEL

CROSS-REFERENCE TO RELATED APPLICATIONS

This application is a division of U.S. utility patent application Ser. No. 09/487,974, filed 20 Jan. 2000 (the '974 application), now U.S. Pat. No. 6,416,842 B1, issued 9 Jul. 2002 (the '842 patent), which in turn claims priority to U.S. provisional application No. 60/116,867, filed 22 Jan. 1999 (the '867 application). This application is also related to U.S. utility patent application Ser. No. 09/014,460, filed 28 Jan. 1998 (the '460 application), now U.S. Pat. No. 6,103,336, issued 15 Aug. 2000 (the '336 patent). The '974, '867, and '460 applications, and the '842 and '336 patents, are hereby incorporated by reference as though fully set forth herein.

BACKGROUND OF THE INVENTION a. Field of the Invention

The instant invention is directed toward a retractable cover for an architectural opening. More specifically, it relates to a cellular panel used to cover an architectural opening and a method of making the same.

b. Background Art

It is well known that cellular panels provide excellent coverings for architectural openings. For example, U.S. Pat. No. 4,603,072 to Colson, the disclosure of which is hereby incorporated by reference, discloses a type of retractable honeycomb cellular panel. A typical honeycomb panel is constructed of a plurality of hollow slats or tubes, stacked and then adhered to one another to form a three-dimensional cellular structure when expanded. In its unexpanded state, the slats or tubes flatten to form a rectangular stack. The height of the stack is dependent upon the length of the panel and the material from which it is made. A retractable multi-cellular honeycomb insulating panel is disclosed in U.S. Pat. No. 5,482,750 to Colson et al.

A related type of honeycomb insulating panel is disclosed in U.S. Pat. No. 4,677,012 to Anderson. In the '012 patent, a cell of the panel is formed by folding a strip of material along longitudinally extending fold lines that bring the longitudinally extending edges of the material near each other. Then, a second length of material is secured to the longitudinally extending edges to form a cell. A plurality of these cells are then affixed together to form a panel. Another related type of honeycomb insulating panel is disclosed in U.S. Pat. Nos. 4,795,515 and 4,871,006 to Kao et al. The '515 patent is directed toward a process and machine for forming the honeycomb panel disclosed therein. According to the '515 patent, a plurality of attaching strips join pleat lines formed in each of the two sheets that comprise the front and rear surfaces of the completed panel. The '006 patent is directed toward a dual fluted shade. Again, in the '006 patent, a plurality of attaching strips join two sheets of fabric along corresponding pleat lines formed in each of the two sheets. Other panels, like those disclosed in the '515 and '006 patents, wherein strips connect adjacent sheets of fabric, are disclosed in U.S. Pat. Nos. 5,228,936 (and B1 5,228,936) to Goodhue and 4,673,600 to Anderson. The '600 patent also discloses a panel wherein the two sheets of material forming the front and back faces are joined directly together. The application that issued as the '600 patent was a division of application Ser. No. 796,035, which eventually issued as U.S. Pat. No. 4,622,255 to Anderson. U.S. Pat. No. 4,685,986 to Anderson also issued from an application that was a division of the '035 application. Whereas the '600 patent claims the honeycomb panel, the '986 patent claims a method of fabricating the panel.

Still another related type of honeycomb panel is disclosed in U.S. Pat. No. 4,631,217 to Anderson. In the panel disclosed in the '217 patent, strips of material are folded into Z-configurations, which are then stacked in layers that are adhered together. U.S. Pat. No. 4,676,855 to Anderson issued from an application that was a division of the application that issued as the '217 patent. Whereas the '217 patent claims the honeycomb panel, the '885 patent claims a method of fabricating the panel.

U.S. Pat. No. 4,019,554 and its corresponding reissue Pat. No. Re. 30,254 to Rasmussen disclose yet another related type of honeycomb panel. The panels disclosed in the '254 and '554 patents are formed by stacking precursor tubular members one on top of another, wherein the top surface of a particular precursor tubular member is bonded to the bottom surface of the next adjacent precursor tubular member, and the bottom surface of the particular precursor tubular member is bonded to the top surface of an adjacent precursor tubular member. The stacked and bonded precursor tubular members forming a resulting thermal insulating curtain.

Various machines are also known that are capable of manufacturing cellular panels at high speed. For example, U.S. Pat. No. 4,450,027 to Colson, the disclosure of which is hereby incorporated by reference, discloses an apparatus for manufacturing cellular panels. Related U.S. Pat. No. 4,631,108 to Colson, the disclosure of which is hereby incorporated by reference, issued from a continuation-in-part of the application that eventually issued as the '027 patent.

The cellular panels manufactured heretofore by interconnecting a plurality of individual precursor tubular cells have generally comprised precursor cells constructed from a single strip of folded material. The resulting elongated precursor tubular cells of a single material are then directly joined together to form a cellular panel. The machine disclosed in the '027 patent may be used to manufacture such panels. Since the precursor tubular cells have been manufactured from single strips of material, however, it has not been possible to obtain the advantages that may be available when the honeycomb panel is constructed of more than one type of material. One such advantage is the ability to construct a cellular panel that is to be used as a window covering wherein one type of material faces inward for viewing by people inside of the room and a second, different material, faces outward. The inward facing side of the panel could be made from an aesthetically pleasing material, whereas the outward facing side could be made from a heat reflective or heat absorptive material. One side of the panel could also be made from a light-blocking material. Similarly, if an installed panel will have a hidden side, each precursor cell may be constructed to have an aesthetically pleasing material on the visible side of the resulting panel and a less expensive, less attractive material on the hidden side of the panel.

SUMMARY OF THE INVENTION

It is desirable to be able to form each precursor tubular cell in a honeycomb panel constructed by interconnecting a plurality of individual precursor tubular cells from a plurality of material types rather than from a single type of material.

Accordingly, it is an object of the disclosed invention to provide an improved retractable cover for an architectural opening. The instant invention is an expandable and contractible honeycomb panel comprising a plurality of parallel rows of interconnected elongated precursor tubular cells, each of the precursor tubular cells being constructed of foldable and creasable material, and each precursor tubular cell comprising at least a first strip of material and a second strip of material. The second strip of material is arranged substantially parallel to the first strip of material, and the two strips are substantially equal in length. The first strip and the second strip are directly joined to each other. The combination of the first strip and the second strip comprises a dual-laminate component that is shaped to form a precursor tubular cell used to construct the honeycomb panel.

Thus, in a first aspect of the present invention, an expandable and contractible honeycomb panel having a front side and a back side comprises a plurality of elongated precursor tubular cells. Each precursor tubular cell is constructed of foldable and creasable material. Each precursor tubular cell comprises a first strip of a first material, and the first strip has a first longitudinal axis and a first length parallel to the first longitudinal axis. Each precursor tubular cell also comprises a second strip of a second material, and the second strip has a second longitudinal axis and a second length parallel to the second longitudinal axis. The second length is substantially equal to the first length, and the second longitudinal axis is arranged substantially parallel to the first longitudinal axis. The second strip is directly joined to the first strip, forming a dual-laminate component, which is then shaped into the precursor tubular cell such that the first material is on the front side of the honeycomb panel, and the second material is on the back side of the honeycomb panel.

In a second aspect of the present invention, a method of manufacturing an expandable and contractible honeycomb panel having a front side and a back side and comprising a plurality of elongated precursor tubular cells is described. Each precursor tubular cell is constructed of foldable and creasable material. The method comprises the steps of placing a first strip of a first material substantially parallel to a second strip of a second material in an overlapping configuration; directly joining the first strip and the second strip, forming a dual-laminate component; and folding the dual-laminate component into a precursor tubular cell. These steps are repeated to create a plurality of precursor tubular cells. Then, the method entails connecting the plurality of precursor tubular cells to form the honeycomb panel such that the first material is on the front side of the honeycomb panel, and the second material is on the back side of the honeycomb panel.

In a third aspect of the present invention, a method of manufacturing an expandable and contractible honeycomb panel having a front side and a back side, and comprising a plurality of alongated precursor tubular cells is described. Each precursor tubular cell is constructed of foldable and creasable material. The honeycomb panel is formed by laying out a first sheet of a first material; laying out a second sheet of a second material, such that the first and second sheets are substantially parallel and overlapping; directly joining the first sheet to the second sheet along a plurality of parallel connecting lines; cutting the joined first and second sheets adjacent one of the plurality of parallel connecting lines, forming a dual-laminate component having a first strip of the first sheet directly joined along a selected connecting line to a second strip of the second sheet. The dual-laminate component is then folded into a precursor tubular cell. These steps are repeated to create a plurality of precursor tubular cells. Then, the method entails connecting the plurality of precursor tubular cells to form the honeycomb panel such that the first material is on the front side of the honeycomb panel, and the second material is on the back side of the honeycomb panel.

A more detailed explanation of the invention is provided in the following description and claims, and is illustrated in the accompanying drawings.

BRIEF DESCRIPTION OF THE DRAWINGS

FIG. 10 is an exploded, cross-sectional view depicting an assembly of two sheets of material to be cut into a second embodiment of elongated precursor tubular cells;

FIG. 11 is a cross-sectional view of the assembly depicted in FIG. 10 further showing cut lines for cutting the assembly into a plurality of elongated precursor tubular cells according to the second embodiment;

FIG. 12 is an enlarged, fragmentary isometric view of the circled portion of FIG. 11, depicting the elongated precursor tubular cell according to the second embodiment before it has been folded;

FIGS. 14–18 depict stages of folding the dual-laminate component depicted in FIGS. 12 and 13 into an elongated precursor tubular cell;

DESCRIPTION OF THE PREFERRED EMBODIMENTS

Figure 1:
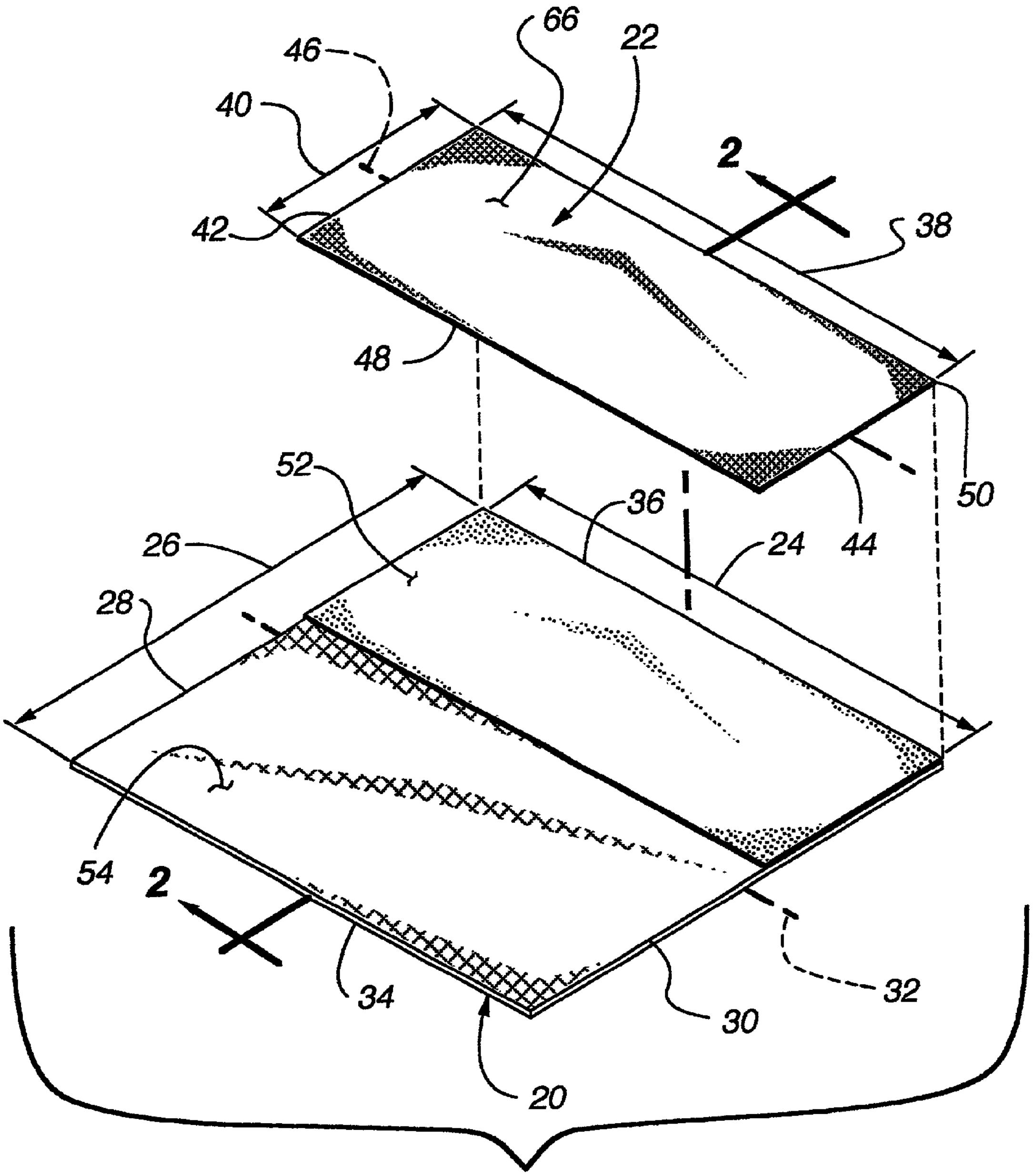
FIG. 1 is an exploded, isometric view of a first embodiment of an elongated precursor tubular cell before it has been assembled and folded.

Two embodiments of a cellular honeycomb panel 10, 10' (see FIGS. 8, 9, 20, and 21) comprising a plurality of elongated precursor tubular cells 12, 12', each precursor cell 12, 12' comprising two strips of material 20, 22, 20', 22', are disclosed. An advantage of the instant invention over the prior art is that the two strips may be of different materials. For example, polymer film, metallized film, nonwoven fabric, woven fabric, knit fabric, and the like. Thus, it is possible to make a cellular honeycomb panel 10, 10' having a different look from its front 14, 14' and back sides 16, 16' using two different materials.

Referring first to FIGS. 1–9, a first embodiment of the present invention is described. FIG. 1 shows an exploded isometric view of a dual-laminate component 18 used to make a cellular honeycomb panel 10 according to a first embodiment of the present invention. As shown in FIG. 1, each dual-laminate component 18 that is to be folded into the precursor tubular cell 12, a plurality of which are assembled into a honeycomb panel 10, includes a first strip of material 20 and a second strip of material 22. In this first preferred embodiment of the invention, the first strip of material 20 has a first length 24 and a first width 26. The first length 24 is the longitudinal distance between a first end 28 and a second end 30 of the first strip 20 parallel to a first longitudinal axis 32. The first width 26 is the lateral distance between a first edge 34 and the second edge 36 of the first strip 20 along a line that is substantially perpendicular to the first longitudinal axis 32. In the first preferred embodiment, wherein the precursor tubular cells 12 of the resulting honeycomb panel 10 are arranged horizontally (see FIGS. 8 and 9), the first length 24 corresponds to the width of the resulting honeycomb panel 10, and the first width 26 is related to the thickness of the resulting honeycomb panel 10.

Similarly, the second strip 22 comprises a second length 38 and a second width 40. The second length 38 is the longitudinal distance between a first end 42 and a second end 44 of the second strip 22 parallel to a second longitudinal axis 46. The second width 40 is the lateral distance between a first edge 48 and a second edge 50 of the second strip 22 along a line that is substantially perpendicular to the second longitudinal axis 46. In the first preferred embodiment, the second width 40 is approximately one-half of the first width 26.

Figure 2:
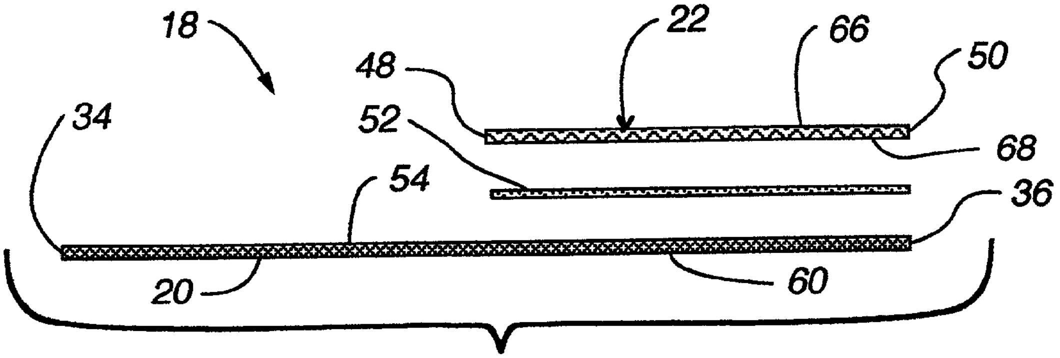
FIG. 2 is an exploded, cross-sectional view of the first embodiment of the elongated precursor tubular cell taken in the plane of line 2—2 of FIG. 1.

FIG. 1 also depicts the adhesive 52, which is shown as a layer on a first side 54 of the first strip 20. In the preferred embodiment the adhesive 52 is spread over the first side 54 of the first strip 20 in an area approximately the same size as a side (66 or 68 in FIG. 2) of the second strip 22. This may be seen to best advantage in FIG. 2, which is a cross-sectional view taken in the plane of line 2—2 of FIG. 1. FIG. 2 is an exploded cross-sectional view of the dual-laminate component 18 that will be ultimately folded into one of the precursor tubular cells 12 that are joined to form the honeycomb panel 10 depicted in FIGS. 8 and 9. As shown in FIGS. 1 and 2, the adhesive 52 is approximately as wide as the second width 40 of the second strip 22. When the second strip 22 is attached to the first strip 20 by the adhesive 52, the dual-laminate component 18 shown in FIG. 3 results.

Figure 3:
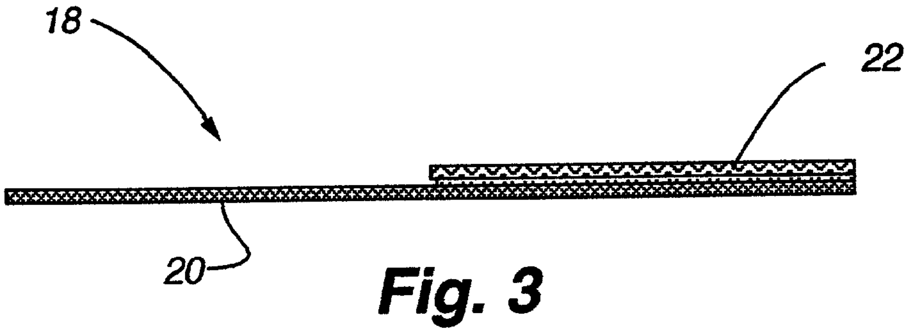
FIG. 3 is a cross-sectional view of the first embodiment of the elongated precursor tubular cell before it has been folded.
Figure 4:
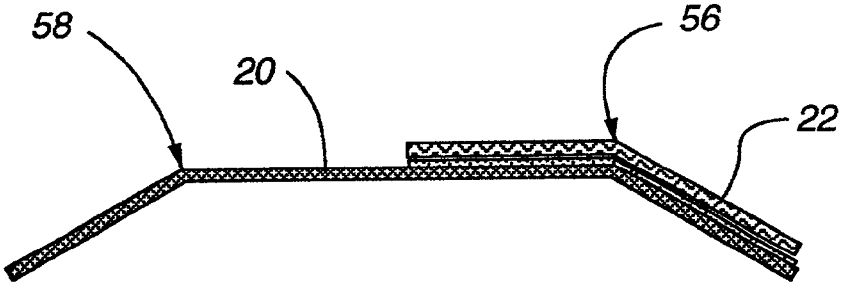
FIG. 4 is a cross-sectional view of the first embodiment of the elongated precursor tubular cell showing initiation of a first fold and a second fold line.
Figure 5:
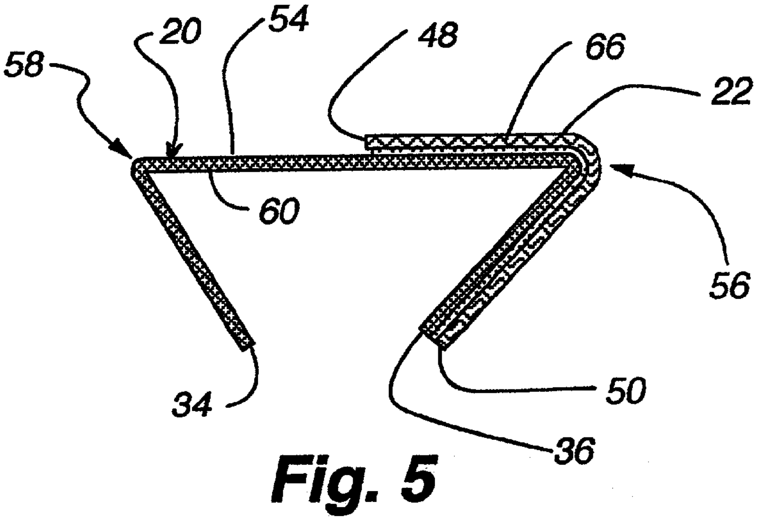
FIG. 5 is a cross-sectional view of the first embodiment of the elongated precursor tubular cell of FIG. 4 shown in an intermediate configuration.
Figure 6:
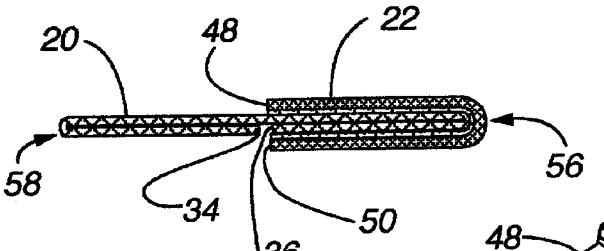
FIG. 6 is a cross-sectional view of the first embodiment of the elongated precursor tubular cell of FIG. 5 in a fully folded configuration.
Figure 7:
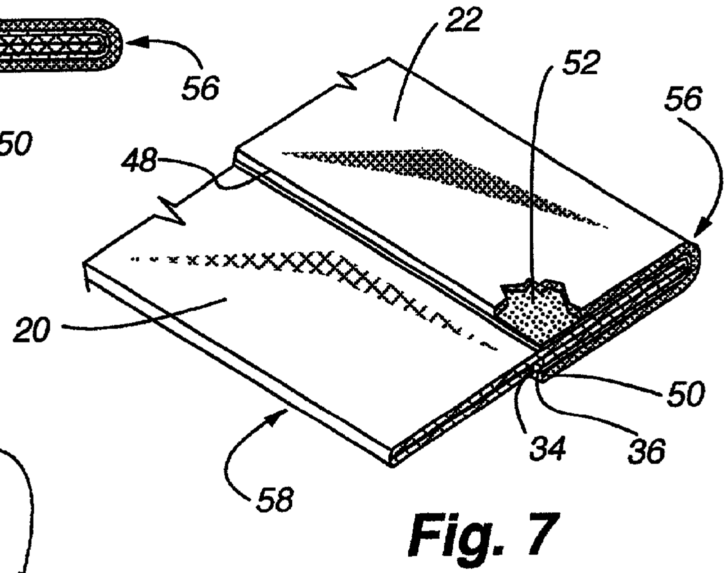
FIG. 7 is a fragmentary isometric view of a portion of the precursor tubular cell depicted in FIG. 6 shown with a portion of the second strip broken away revealing the adhesive.

The dual-laminate component 18 depicted in FIG. 3 is then folded into a precursor tubular cell 12 as shown, for example, by FIGS. 3, 4, 5, and 6. As shown by comparing FIGS. 3 and 4, a possible first step for forming a precursor tubular cell 12 comprises folding the dual-laminate component 18 of FIG. 3 along a first fold line 56 and a second fold line 58. FIGS. 5 and 6 depict further progression of the fold until a second side 60 of the first strip 20 is folded against itself along the first fold line 56 and the second fold line 58 (see FIGS. 6 and 7). FIG. 7 depicts a flattened precursor tubular cell 12 according to a first embodiment of the present invention. A portion of the second strip 22 adjacent its first edge 48 is broken away to show the adhesive 52 between the second strip 22 and the first strip 20. In this configuration, the first edge 34 of the first strip 20 is adjacent the second edge 36 of the first strip 20. It should be noted that it is not necessary for hard creases to be present along the first fold line 56 and the second fold line 58. As depicted, the first fold line 56 and the second fold line 58 do comprise sharp creases, which facilitates assembly of the honeycomb panel 10 from a plurality of precursor tubular cells 12.

Figure 8:
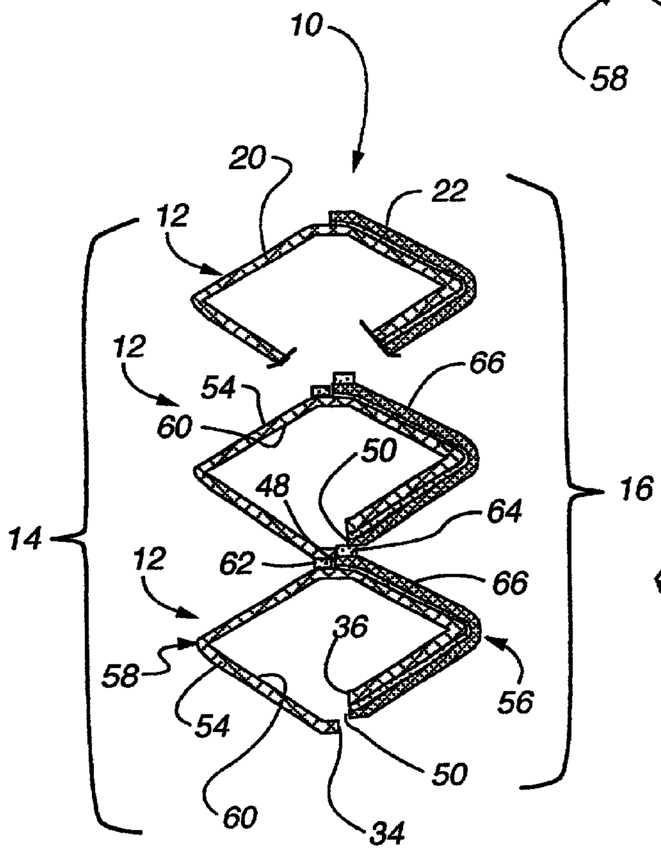
FIG. 8 is a cross-sectional view of a plurality of precursor tubular cells according to the first embodiment and forming a honeycomb panel.
Figure 9:
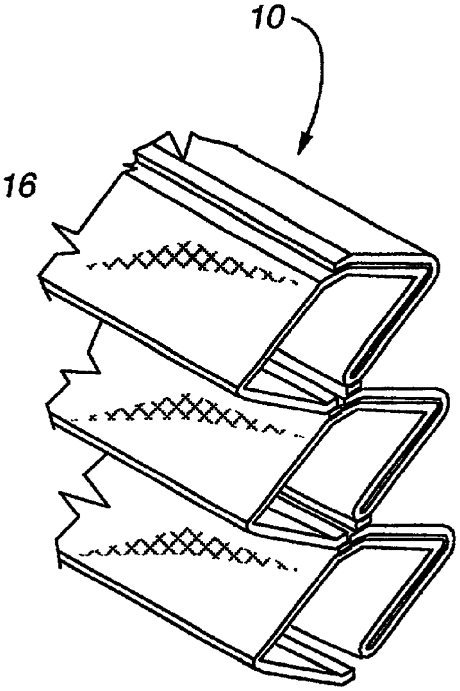
FIG. 9 is a fragmentary isometric view of a portion of the panel formed using precursor tubular cells according to the first embodiment.

Referring now to FIGS. 8 and 9, assembly of the honeycomb panel 10 from a plurality of precursor tubular cells 12 formed according to the previous discussion is described. As shown in FIG. 8, two precursor tubular cells 12 according to the first embodiment are joined by a first adhesive bead 62 and a second adhesive bead 64. In this preferred embodiment, the first adhesive bead 62 is applied to the first side 54 of the first strip 20 adjacent the first edge 48 of the second strip 22. This first adhesive bead 62 thus extends parallel and adjacent the first longitudinal axis 32. Alternatively, this first adhesive bead 62 could have been placed on the first side 54 of the first strip 20 of the next adjacent elongated precursor tubular cell 12 adjacent the first edge 34 of that first strip 20. Either way, when two precursor tubular cells 12 are placed adjacent each other, the first side 54 of the first strip 20 of a first precursor tubular cell 12 (e.g., the lowermost precursor tubular cell as depicted in FIG. 8) is adhered to the first side 54 of the first strip 20 of the next adjacent precursor tubular cell 12 (e.g., the middle precursor tubular cell 12 as depicted in FIG. 8). The second adhesive bead 64 may be applied to a first side 66 of the second strip 22 of either of two adjacent precursor tubular cells 12. For example, as depicted in FIG. 8, the second adhesive bead 64, which also extends longitudinally and substantially parallel to the first and second longitudinal axes 32, 46, respectively, could be applied to the first side 66 of the second strip 22 of the precursor tubular cell depicted in the middle of FIG. 8, adjacent the second edge 50 of the second strip 22, or the second adhesive bead 64 could be applied to the first side 66 of the second strip 22 of the lowermost precursor tubular cell depicted in FIG. 8, adjacent the first edge 48 of the lowermost second strip 22. Either way, when two precursor tubular cells 12 are placed adjacent each other and pressed together, the first side 66 of the respective second strips 22 of each adjacent precursor tubular cell 12 are affixed to one another.

The assembled panel 10, a portion of which is shown in FIGS. 8 and 9, has a different appearance from its front side 14 when compared to the appearance from its back side 16. When viewing the resulting honeycomb panel 10 from the front side 14, only the material comprising the first strips 20 of each precursor tubular cell 12 is visible. In contrast, when viewing the resulting honeycomb panel 10 from its back side 16, only the second strips 22 of each precursor tubular cell 12 comprising the panel 10 are visible. Thus, when the material used for the first strips 20 is different from the material used for the second strips 22, the resulting panel 10 looks different when viewed from its front and back sides 14, 16, respectively. If desired, the first strip 20 could have a different appearance from its first and second sides 54, 60, respectively, and the second strip 22 could have a different appearance from its first and second sides 66, 68, respectively. Thus, additional variations could be obtained by controlling which side of the respective first and second strips 20, 22, are visible in the dual-laminate component 18 depicted in FIG. 3.

Referring now to FIGS. 10, 11, 12, 13, 14, 15, 16, 17, 18, 19, 20, and 21, a second embodiment of the invention shall be described. FIG. 10 is an exploded cross-sectional view of an assembly 70 from which dual-laminate components 18' that will be formed into precursor tubular cells 12' are cut. As shown in FIG. 10, the assembly 70 comprises a first sheet of material 72, a second sheet of material 74, and a plurality of parallel connecting lines 76, which are long beads of adhesive in the preferred embodiment, but which could also be, for example, lines of stitching or sonic weld lines. To form the assembly depicted in FIG. 11, the second sheet of foldable and creasable material 74 is laid down, and parallel lines of adhesive 76 are applied to the second sheet 74. Then, the first sheet of material 72 is laid on top of the second sheet 74. The lines of adhesive 76 secure the first sheet 72 to the second sheet 74 as shown in FIG. 11. Once the assembly 70 depicted in FIGS. 10 and 11 has been formed, a plurality of cuts 78 are made (FIG. 11). Each cut 78 is made in the assembly 70 comprising the first and second sheets 72, 74, respectively, by cutting adjacent to one side of each adhesive bead 76. This results in a plurality of subassemblies or dual-laminate components 18' like those depicted in FIGS. 12–19. Each of these dual-laminate components 18' comprises a first strip of material 20', a second strip of material 22', and an adhesive bead 76 attaching the first strip 20' to the second strip 22' along one edge of each strip. In particular, as best shown in FIG. 14, each dual-laminate component 18 comprises a first strip 20' having a first side 54', a second side 60', a first edge 34', and a second edge 36'; and a second strip 22', also comprising a first side 66', a second side 68', a first edge 48', and a second edge 50'. As shown, the adhesive 76 is between the first strip 20' and the second strip 22' so as to attach the second side 60' of the first strip 20' to the first side 66' of the second strip 22' near the second edge 36' of the first strip 20' and the second edge 50' of the second strip 22'.

Figure 13:
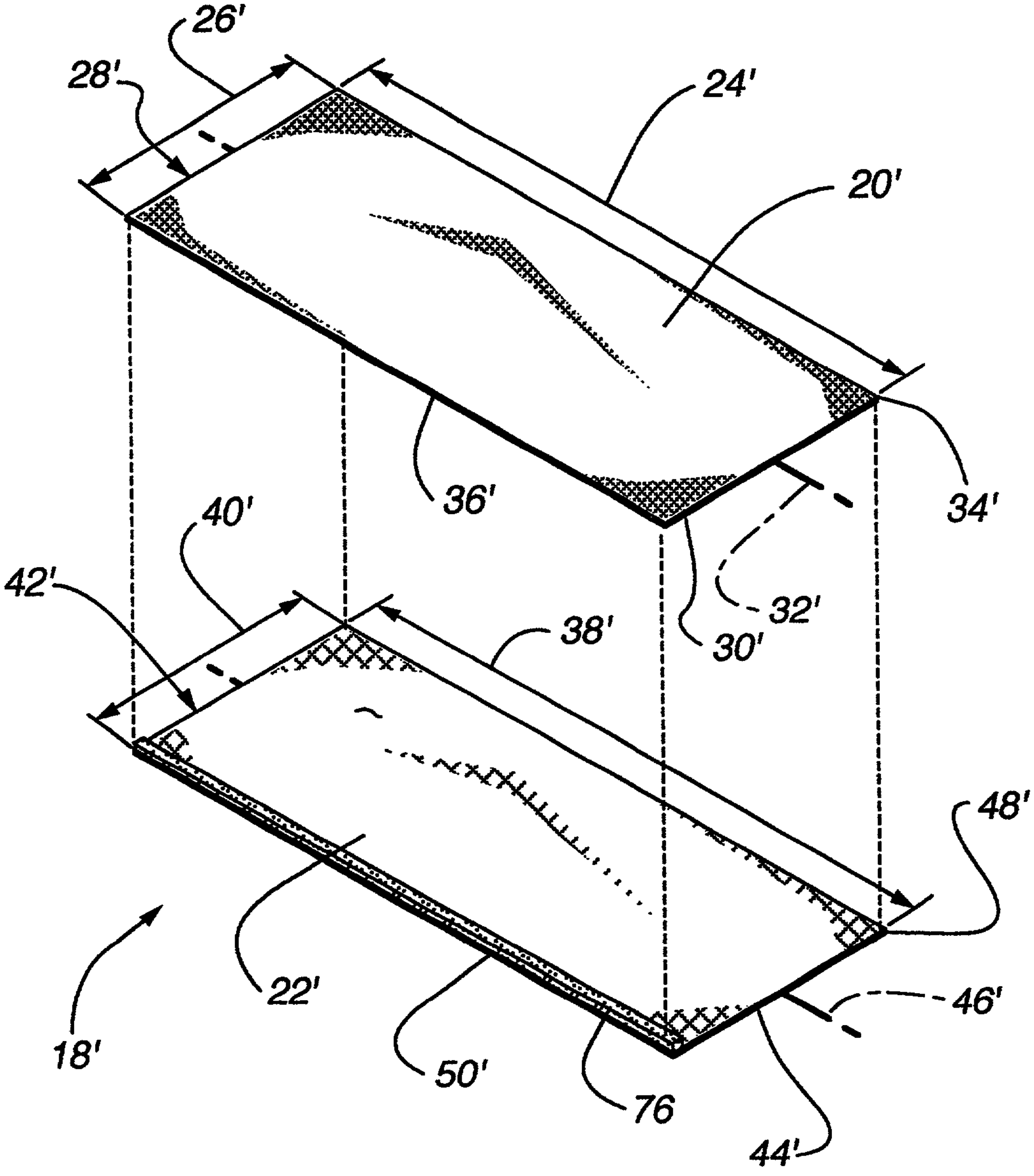
FIG. 13 is an exploded, isometric view of the unfolded, elongated precursor tubular cell depicted in FIGS. 11 and 12.

An exploded, isometric view of a dual-laminate component 18' according to the second preferred embodiment is clearly shown in FIG. 13. The first strip 20' of material has a first length 24', parallel to a first longitudinal axis 32', between a first end 28' and a second end 30' of the first strip 20'. The first strip 20' also has a first width 26', which is the perpendicular distance between a first edge 34' and a second edge 36' of the first strip 20' along a line that is substantially perpendicular to the first longitudinal axis 32'. Similarly, the second strip 22' comprises a second length 38', which is the distance between a first end 42' and a second end 44' of the second strip 22' parallel to a second longitudinal axis 46'. The second strip 22' also comprises a second width 40', which is a lateral distance between a first edge 48' and a second edge 50' of the second strip 22' along a line that is substantially perpendicular to the second longitudinal axis 46'. As a result of how each dual-laminate component 18' is made in this second preferred embodiment, the first width 26' is substantially equal to the second width 40', and the first length 24' is substantially equal to the second length 38'.

Figure 15:
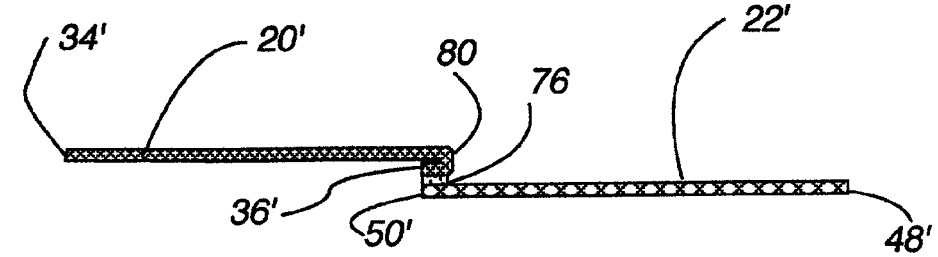
Figure 16:
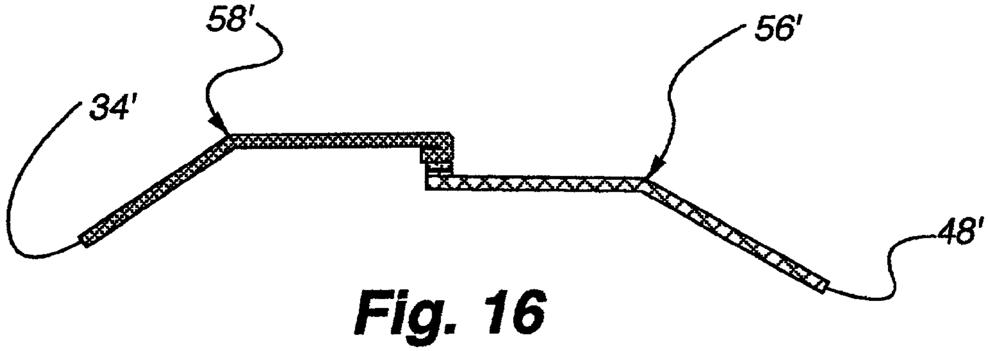
Figure 17:
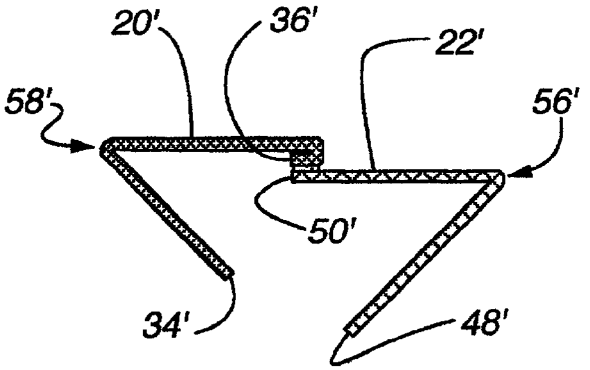
Figure 18:
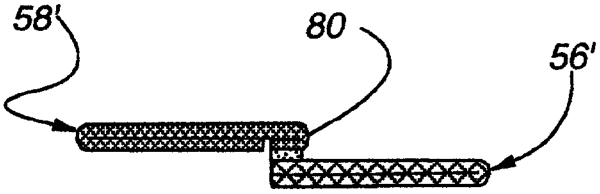
Figure 19:
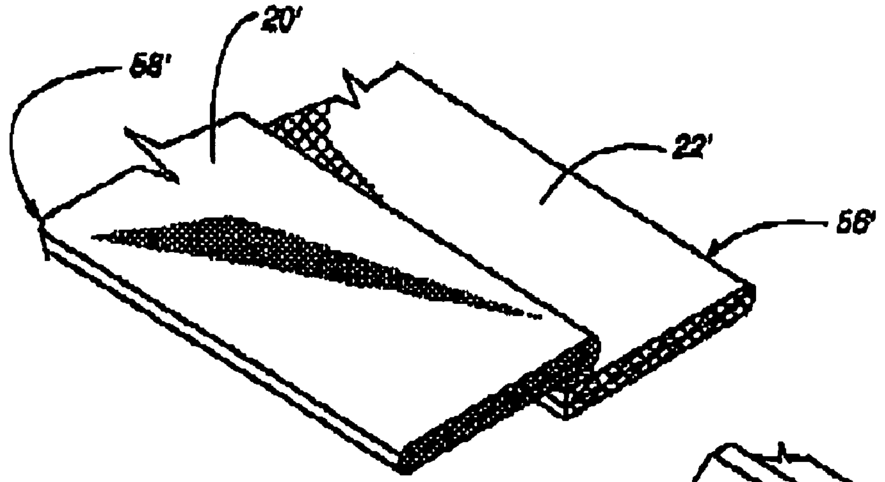
FIG. 19 is a fragmentary isometric view of the unopened elongated precursor tubular cell depicted in FIG. 18.
Figure 21:
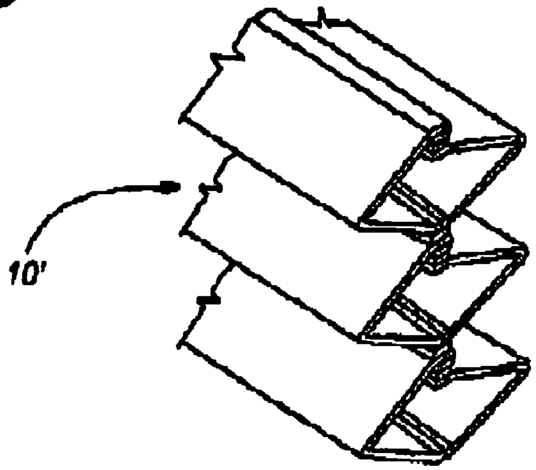
FIG. 21 is a fragmentary isometric view of a portion of the honeycomb panel depicted in FIG. 20.
Figure 20:
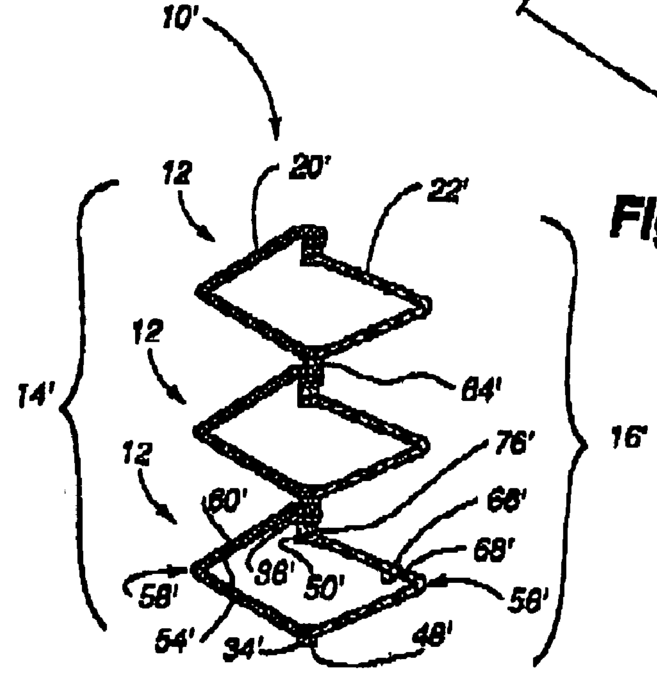
FIG. 20 is a cross-sectional view of a plurality of precursor tubular cells according to the second embodiment and forming a honeycomb panel.

FIGS. 14, 15, 16, 17, and 18 show the steps of this preferred embodiment for folding the dual-laminate component 18' into a flattened precursor tubular cell 12' used to form the honeycomb panel 10' depicted in FIGS. 20 and 21. In particular, the dual-laminate component 18' depicted in FIG. 12 is "opened" by folding the first edge 34' of the first strip 20' away from the first edge 48' of the second strip 22' along a third fold line 80, until the first edge 34' of the first strip 20' is approximately as far away as possible from the first edge 48' of the second strip 22', as shown in FIG. 15. Subsequently, the dual-laminate component 18' is folded along a first fold line 56' and a second fold line 58'. The first edge 34' of the first strip 20' is then brought toward the first edge 48' of the second strip 22' as shown in FIGS. 16 and 17 as the fold along the first fold line 56' and the fold along the second fold line 58' is increased. Ultimately, the configuration depicted in FIGS. 18 and 19 is obtained. The configuration depicted in FIGS. 18 and 19 shows a flattened precursor tubular cell 12' ready for assembly into a honeycomb panel 10' depicted in FIGS. 20 and 21. Although the discussion of this second embodiment and of the other embodiment refers to folds or creases, the instant invention does not require them. Creases may be beneficial for some uses of the invention and are used in this disclosure for illustrative purposes, but are not required and need not be severe or well-defined.

The process of gluing first and second strips 20', 22', respectively, together and of creasing the resulting dual-laminate component 18', repeated several times, produces a plurality of elongated precursor tubular cells 12'. This plurality of elongated precursor tubular cells 12' may then be connected together to form a honeycomb panel 10' as depicted in FIGS. 20 and 21. As shown to best advantage in FIG. 20, a second adhesive bead 64' is used to attach one elongated precursor tubular cell 12' to an adjacent elongated tubular cell 12'. In the preferred embodiment, the second adhesive bead 64' is applied to the second side 60' of the first strip 20' of material adjacent the third fold line 80. This second adhesive bead 64' extends parallel to the first and second longitudinal axes 32', 46', respectively, for the first length 24' of the first strip 20'. Once the second adhesive bead 64' has been applied, a next adjacent elongated precursor tubular cell 12' may be pressed against the adhesive bead 64' such that the portion of the first strip 20' and of the second strip 22' adjacent their first edges 34', 48' are adhered to the exposed side of the second adhesive bead 64'.

The adhesive 52, 62, 64, 76, 64' may be made from a heat-activated or other type of adhesive. For example, the aliphatic adhesives have been used successfully in construction of honeycomb panels 10, 10' according to the instant invention.

Although two embodiments of this invention have been described above, those skilled in the art could make numerous alterations to the disclosed embodiments without departing from the spirit or scope of this invention. For example, although the first strip 20 is substantially twice as wide as the second strip 22 in the first embodiment, and although the first strip 20' and the second strip 22' are substantially the same size in the second embodiment, this need not be the case. Also, although folds have been variously designated "first," "second," and "third," one of ordinary skill in this art would recognize that folds or creases could be made in a variety of different orders. Similarly, indications of direction or orientation (e.g., top and bottom) are for the convenience of the reader and should not be read as limiting. An important feature in this invention is that different types of material may be united directly to each other to form one or more of the individual, elongated precursor tubular cells 12, 12' that are subsequently interconnected to form the resultant honeycomb panel 10, 10'. Also, although the honeycomb panels 10, 10' depicted in the figures are oriented such that they expand and contract vertically, they could be hung such that they would expand and contract horizontally without departing from the scope of this invention. It is intended that all matter contained in the above description or shown in the accompanying drawings shall be interpreted as illustrative only and not limiting.

We claim:

1. A method of manufacturing an expandable and contractible honeycomb panel having a front side and a back side, said honeycomb panel comprising a plurality of elongated precursor tubular cells, said precursor tubular cells being constructed of foldable and creasable material, said method comprising the steps of (a) placing a first strip of a first material substantially parallel to a second strip of a second material in an overlapping configuration; (b) directly joining said first strip and said second strip, forming a dual-laminate component; (c) folding said dual-laminate component into a precursor tubular cell; (d) repeating steps (a) through (c) to create said plurality of precursor tubular cells; and (e) connecting said plurality of precursor tubular cells to form said honeycomb panel such that only said first material is on said front side of said honeycomb panel and said first and second materials are on said back side of said honeycomb panel.

2. The method of claim 1, wherein said joining step comprises heat lamination.

3. The method of claim 1, wherein said joining step comprises application of an adhesive.

4. A method of manufacturing an expandable and contractible honeycomb panel having a front side and a back side, said method comprising the steps of (I) creating a plurality of elongated precursor tubular cells, each of said precursor tubular cells being constructed of foldable and creasable material, said creating step further comprising the steps of (a) laying out a first strip of a first material, said first strip having a first longitudinal axis and a first length parallel to said first longitudinal axis; (b) laying out a second strip of a second material, said second strip having a second longitudinal axis and a second length parallel to said second longitudinal axis, said second length being substantially equal to said first length, and said second longitudinal axis being arranged substantially parallel to said first longitudinal axis; (c) directly affixing said second strip to said first strip, forming a dual-laminate component, and (d) shaping said dual-laminate component into said precursor tubular cell such that only said first material is on said front side of said honeycomb panel and said first and second materials are on said back side of said honeycomb panel; and (II) joining said plurality of elongated precursor tubular cells to form said honeycomb panel.

5. The method of claim 4, wherein said step (I)(b) further comprises laying out said second strip of said second material wherein said second material is different from said first material.

6. The method of claim 4, wherein, for each precursor tubular cell, said first strip of material further comprises a first width substantially perpendicular to said first longitudinal axis, said second strip of material further comprises a second width substantially perpendicular to said second longitudinal axis, and wherein said step (I)(b) further comprises selecting said second ship of material such that said second width is less than said first width, and such that said second material is different from said first material.

7. A method of manufacturing an expandable and contractible honeycomb panel having a front side and a back side, said method comprising the steps of (I) creating a plurality of elongated precursor tubular cells, each of said precursor tubular cells being constructed of foldable and creasable material, said creating step further comprising the steps of (a) selecting a first strip of a first material, said first strip having a first longitudinal axis, a first width perpendicular to said first longitudinal axis, and a first length parallel to said first longitudinal axis; (b) selecting a second strip of a second material, said second material being different from said first material, and said second strip having a second longitudinal axis, a second width perpendicular to said second longitudinal axis, said second width being less than said first width, and a second length parallel to said second longitudinal axis, said second length being substantially equal to said first length; (c) placing said first strip of said first material substantially parallel to said second strip of said second material in an overlapping configuration, said second longitudinal axis thus being arranged substantially parallel to said first longitudinal axis; (d) directly joining said second strip to said first strip, forming a dual-laminate component; and (e) shaping said dual-laminate component into said precursor tubular cell such that only said first material is on said front side of said honeycomb panel and said first and second materials are on said back side of said honeycomb panel; and (II) joining said plurality of elongated precursor tubular cells to form said honeycomb panel.

8. The method of claim 7, wherein, for each precursor tubular cell, said steps (I)(a) and (I)(b) further comprise selecting said first strip of said first material and said second strip of said second material such that said first width is substantially twice said second width.

9. The method of claim 7 or 8, wherein said first strip of material comprises a first edge and a second edge, said second strip of material comprises a first edge and a second edge, and wherein said step (I)(c) further comprise placing said first strip of said first material substantially parallel to said second strip of said second material while ensuring that, in each said dual-laminate component, said second edge of said first strip is adjacent said second edge of said second strip.

10. The method of claim 9, wherein said steps (I)(a) and (I)(b) further comprise selecting said first material and said second material from the group consisting of polymer film, metallized fabric, nonwoven fabric, woven fabric, and knit fabric.

11. The method of claim 9, wherein said step (I)(d) results in a layered portion of said dual-laminate component, said layered portion consisting of that portion of said dual-laminate component wherein the first strip of material and the second strip of material are joined, and wherein said step (e) further comprises shaping said dual-laminate component such that said layered portion is on said back side of said honeycomb panel.

* * * * *